United States Patent
Hinchey et al.

(10) Patent No.: US 7,739,671 B1
(45) Date of Patent: Jun. 15, 2010

(54) SYSTEMS, METHODS AND APPARATUS FOR IMPLEMENTATION OF FORMAL SPECIFICATIONS DERIVED FROM INFORMAL REQUIREMENTS

(75) Inventors: Michael G. Hinchey, Bowie, MD (US); James L. Rash, Davidsonville, MD (US); John D. Erickson, Midland, TX (US); Denis Gracinin, Blacksburg, VA (US); Christopher A. Rouff, Beltsville, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1260 days.

(21) Appl. No.: 11/203,590

(22) Filed: Aug. 12, 2005

Related U.S. Application Data

(63) Continuation-in-part of application No. 10/789,028, filed on Feb. 25, 2004, now Pat. No. 7,543,274.

(60) Provisional application No. 60/533,376, filed on Dec. 22, 2003, provisional application No. 60/603,521, filed on Aug. 13, 2004.

(51) Int. Cl.
*G06F 9/44* (2006.01)
*G06F 9/45* (2006.01)
*G06F 17/00* (2006.01)
*G06N 5/04* (2006.01)
*G06N 5/02* (2006.01)

(52) U.S. Cl. .......... 717/136; 717/117; 717/106; 717/146; 706/922; 706/56; 706/60; 706/46; 706/47

(58) Field of Classification Search .......... None
See application file for complete search history.

(56) References Cited

U.S. PATENT DOCUMENTS

| | | | |
|---|---|---|---|
| 5,101,491 A * | 3/1992 | Katzeff | 703/22 |
| 5,485,615 A * | 1/1996 | Wennmyr | 717/109 |
| 5,815,713 A | 9/1998 | Sanders | |
| 6,408,431 B1 | 6/2002 | Heughebaert et al. | |
| 6,681,383 B1 | 1/2004 | Pastor et al. | |
| 6,684,388 B1 | 1/2004 | Gupta et al. | |
| 6,772,409 B1 | 8/2004 | Chawla et al. | |
| 2002/0100014 A1 * | 7/2002 | Iborra et al. | 717/104 |
| 2003/0110472 A1 | 6/2003 | Alloing et al. | |
| 2004/0015832 A1 | 1/2004 | Stapp et al. | |

(Continued)

OTHER PUBLICATIONS

Author: Hähnle et al.; Title: "An Authoring Tool for Informal and Formal Requirements Specifications"; Date: 2002; URL: http://www.springerlink.com/content/9b5wu2v0ea0Inyrb/fulltext.pdf.*

(Continued)

*Primary Examiner*—Lewis A Bullock, Jr.
*Assistant Examiner*—Joseph Kelly
(74) *Attorney, Agent, or Firm*—Heather Goo

(57) ABSTRACT

Systems, methods and apparatus are provided through which in some embodiments an informal specification is translated without human intervention into a formal specification. In some embodiments the formal specification is a process-based specification. In some embodiments, the formal specification is translated into a high-level computer programming language which is further compiled into a set of executable computer instructions.

19 Claims, 6 Drawing Sheets

U.S. PATENT DOCUMENTS

| | | | |
|---|---|---|---|
| 2004/0064804 A1 | 4/2004 | Daniels et al. |
| 2004/0073899 A1 | 4/2004 | Luk et al. |
| 2004/0143814 A1 | 7/2004 | de Jong |
| 2004/0230945 A1 | 11/2004 | Bryant et al. |
| 2004/0233232 A1 | 11/2004 | Iborra et al. |
| 2005/0010895 A1 | 1/2005 | Reddappagari |
| 2005/0050513 A1 | 3/2005 | Motoyama et al. |

OTHER PUBLICATIONS

Author: Moulding et al.; Title: "Combining formal specification and CORE: an experimental investigation"; Date: Mar. 1995; URL: http://ieeexplore.ieee.org/stamp/stamp.jsp?tp=&arnumber=373906&isnumber=8550.*

Author: JavaWorld.com; Title: "Run the Java program without the JDK runtime? Yes you can! (Apr. 20, 1999)"; URL: http://www.javaworld.com/javaworld/javaqa/1999-04/03-noruntime.html.*

Author: Jackson et al.; Title: "Automated support for the development of formal object-oriented requirements specifications"; Date: 1994; URL: http://www.springerlink.com/content/7385755m5jm60121/fulltext.pdf.*

Author: Letelier et al.; Title: "Prototyping a Requirements Specification through an Automatically Generated Concurrent Logic Program"; Date: Jan. 1, 1998; URL: http://www.springerlink.com/content/wgn3ma1ae67n3mld/fulltext.pdf.*

* cited by examiner

SYSTEMS, METHODS AND APPARATUS FOR IMPLEMENTATION OF FORMAL SPECIFICATIONS DERIVED FROM INFORMAL REQUIREMENTS

RELATED APPLICATIONS

This application claims the benefit of U.S. Provisional Application Ser. No. 60/603,521 filed Aug. 13, 2004 under 35 U.S.C. 119(e).

This application is a continuation-in-part of U.S. application Ser. No. 10/789,028 filed Feb. 25, 2004 now U.S. Pat. No. 7,543,274 entitled "System and Method for Deriving a Process-based Specification," which claims the benefit of U.S. Provisional Application Ser. No. 60/533,376 filed Dec. 22, 2003.

ORIGIN OF THE INVENTION

The invention described herein was made by a employees of the United States Government and may be manufactured and used by or for the Government of the United States of America for governmental purposes without the payment of any royalties thereon or therefor.

FIELD OF THE INVENTION

This invention relates generally to software development processes and more particularly to deriving formal specifications from informal specifications.

BACKGROUND OF THE INVENTION

Requirements-Based Programming (RBP) has been advocated as a viable means of developing complex, evolving systems. In RBP, requirements can be systematically transformed into executable computer instructions. An implementation of RBP provides a way to generate executable computer instructions from requirements with neither the time involved in manually writing the executable computer instructions, nor the mistakes regarded (generally speaking) as unavoidable in manually writing the executable computer instructions.

Complex systems in general cannot attain high dependability without addressing the crucial remaining open issues of software dependability. The need for ultrahigh dependability systems increases continually, along with a correspondingly increasing need to ensure correctness in system development. Correctness exists where the implemented system is equivalent to the requirements, and where this equivalence can be proved mathematically.

Development of a system that will have a high level of reliability requires the developer to represent the system as a formal model that can be proven to be correct.

Conventional system development tools and methods that are based on formal models provide neither automated generation of the models from requirements nor automated proof of correctness of the models. Conventional system development tools and methods provide no automated, generally applicable way to produce a system—or even a procedure—that is a provably correct implementation of the customer's requirements. Furthermore, requirements engineering as a discipline has yet to produce an automated, mathematics-based process for requirements validation. Automatic code generation from requirements has been the ultimate objective of software engineering almost since the advent of high-level programming languages, and calls for capability of "requirements-based programming" have become strong.

Several tools and products exist in the marketplace today for automatic code generation from a given model; however, these tools and products typically generate code, portions of which are never executed, or portions of which cannot be justified from either the requirements or the model. Moreover, existing tools do not and cannot overcome the fundamental inadequacy of all currently available automated development approaches, which is that they include no way to establish a provable equivalence between the requirements stated at the outset and either the model or the code they generate.

In particular, one tool for deriving executable code from informal notations requires translating the informal specifications into traces, and then using an automated theorem prover to infer an equivalent process-based description. Traces are sequences of events that have occurred in a particular ordering up to a particular point in time. Inferring an equivalent process based specification from the traces requires large computational facilities, sometimes even as large as a supercomputer.

Traditional approaches to automatic code generation, including those embodied in commercial products such as Matlab®, in system development toolsets such as the B-Toolkit® or the VDM++® toolkit, or in academic research projects, presuppose the existence of an explicit (formal) model of reality that can be used as the basis for subsequent code generation. However, these traditional approaches not only depend on other ways to provide the explicit formal model, but also include no facility to ascertain or establish that the model corresponds to the customer's requirements. While such an approach is reasonable, the advantages and disadvantages of the various modeling approaches used in computing are well known, and certain models can serve well to highlight certain issues while suppressing other, less-relevant details. The converse is also true. Certain models of reality, while successfully detailing many of the issues of interest to developers, can fail to capture some important issues, or perhaps even the most important issues. Existing reverse-engineering approaches suffer from a similar plight. In typical approaches, a model is extracted from an existing system and is then represented in various ways, for example as a digraph. The re-engineering process then involves using the resulting representation as the basis for code generation, as indicated above.

The model on which automatic code generation is based is referred to as a design, or more correctly, a design specification. There is typically a mismatch between this design specification and the implementation (sometimes termed the "specification-implementation gap") in that the process of going from a suitable design to an implementation involves many practical decisions that must be made by the automated tool used for code generation without any clear-cut justifications other than the predetermined implementation decisions of the tool designers. Further, there is a more problematic "gap," termed the "analysis-specification gap," that emphasizes the problem of capturing requirements and adequately representing them in a specification that is clear, concise, and complete. This specification must be formal, or proof of correctness is impossible.

Unfortunately, many software system designers are reluctant to embrace formal specification techniques, believing the formal specification techniques to be difficult to use and apply, despite many industrial success stories. While software system designers are happy to write descriptions as natural language scenarios, or even using semi-formal notations such as unified modeling language (UML) use cases, the software system designers are reticent to undertake formal specification. However, absent a formal specification of the system under consideration, there is no possibility of determining any acceptable level of confidence in the correctness of an implementation. More importantly, formal specification must be ensured to have fully, completely, and consistently captured the prescribed requirements. System requirements cannot be expected to be perfect, complete, and consistent from the outset, which is why it is even more important to have a formal specification. Such a formal specification can highlight errors, omissions, and conflicts. The formal specification must also reflect changes and updates from system maintenance, as well as changes and compromises in requirements, so that it remains an accurate representation of the system throughout the life cycle of a system.

Requirements typically evolve during the life cycle of a system, Manual change to the system creates a risk of introducing new errors and necessitates retesting and revalidation, which can greatly increase the cost of the system. Often, needed changes are not made due to the cost of making consequential changes in the rest of the system. Sometimes changes are simply made in the code and not reflected in the specification or design due to the cost or due to the fact that those who generated the original specification or design are no longer available.

For the reasons stated above, and for other reasons stated below which will become apparent to those skilled in the art upon reading and understanding the present specification, there is a need in the art for an automated, generally applicable approach to produce a system that is a provably correct implementation of an informal design specification that does not require use of a theorem-prover. There is a further need for a convenient way of generating a new system when system requirements change. There is also a need for an automated, mathematics-based process for requirements validation that does not require large computational facilities.

BRIEF DESCRIPTION OF THE INVENTION

The above-mentioned shortcomings, disadvantages and problems are addressed herein, which will be understood by reading and studying the following specification.

General-purpose systems, methods and apparatus to transform informal system requirements into a provably equivalent formal model are described herein. Such a method represents a step toward high-dependability system engineering for numerous possible application domains. For the classes of systems whose behavior can be described as a finite set of scenarios, methods transform informal requirements into a provably equivalent formal model that can be used as the basis for code generation and other transformations.

A formal model is automatically transformed into code with minimal or no human intervention to reduce the chance of inadvertent introduction of errors by developers. Automatically producing the formal model from customer requirements further reduces the chance of insertion of errors by developers.

Specifications are written as informal scenarios in constrained natural language, or in a range of other notations. The scenarios will be used to derive a formal model that is equivalent to the requirements stated at the outset, and which subsequently will be used as a basis for code generation. The formal model can be expressed using a variety of formal methods. In some embodiments, Hoare's language of Communicating Sequential Processes (CSP) is used, which is suitable for various types of analysis and investigation, and as the basis for fully formal implementations, as well as for use in automated test case generation, etc.

In one aspect, a method to generate a process-based specification from an informal specification includes translating an informal specification to a plurality of process-based specification segments and translating the plurality of process-based specification segments to high-level computer language instructions.

In further aspect, the translation of the informal specification includes interpreting or translating meaningful expressions in the syntax of the informal specification and thereby mapping, in more-or-less direct fashion, the informal specification to a process-based specification.

In another aspect, a method to generate a process-based specification from an informal specification includes translating each of a plurality of requirements of the informal specification to a plurality of process-based specification segments, aggregating the plurality of process-based specification segments into a single process-based specification model, and translating the single process-based specification model to instructions encoded in Java computer language or other implementation language.

Systems, clients, servers, methods, and computer-readable media of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

This detailed description is divided into five sections. In the first section, an embodiment of a system level overview is described. In the second section, embodiments of methods are described. In the third section, an embodiment of the hardware and the operating environment in conjunction with which embodiments may be practiced is described. In the fourth section, particular implementations of embodiments are described. Finally, in the fifth section, a conclusion of the detailed description is provided.

System Level Overview

Figure 1:
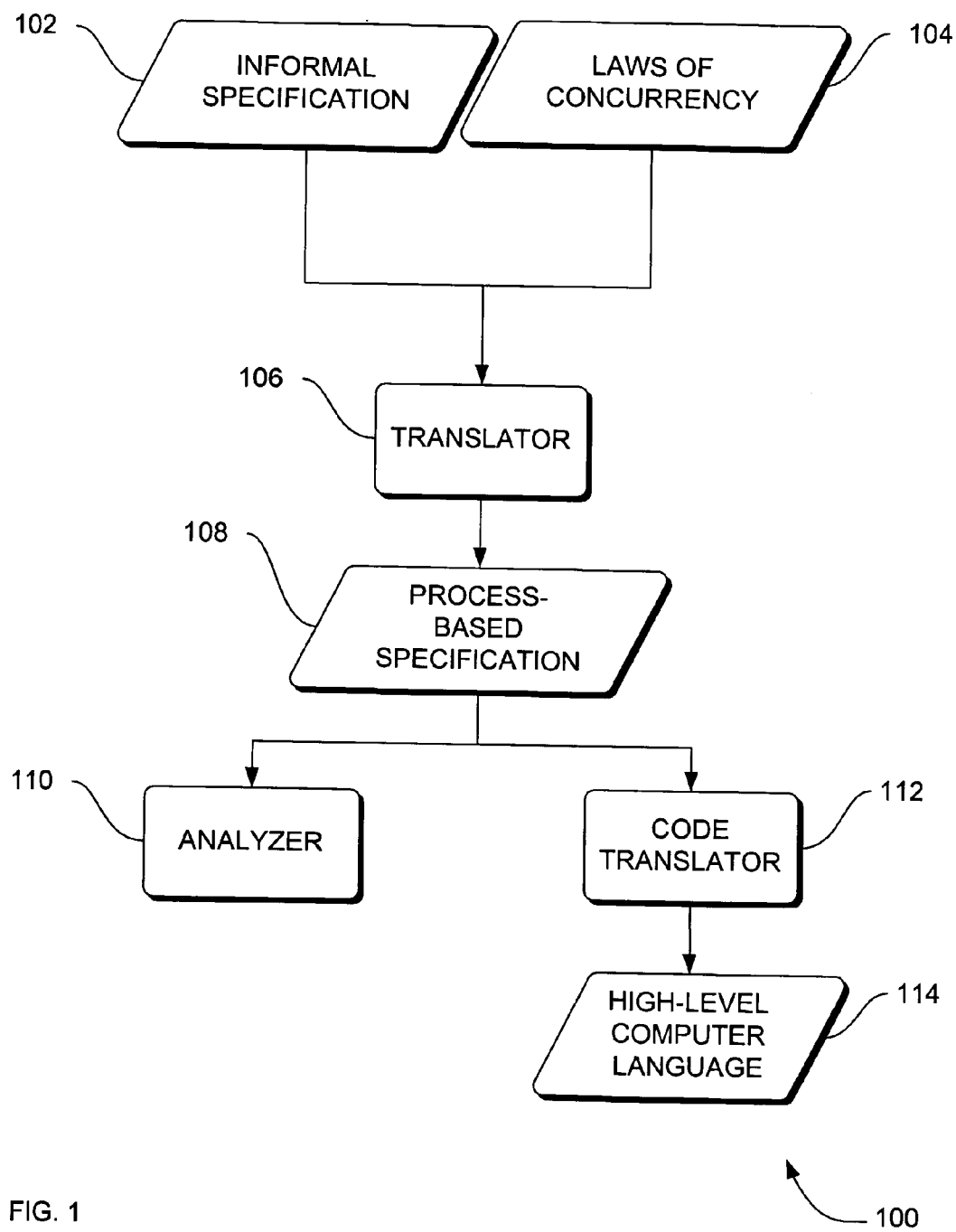
FIG. 1 is a block diagram that provides an overview of a system to generate a high-level computer source code program from an informal specification, according to an embodiment of the invention.

FIG. 1 is a block diagram that provides an overview of an embodiment of a system 100 to generate a high-level computer source code program from an informal specification. The system 100 solves the need in the art for an automated, generally applicable way to produce a system that is a provably correct implementation of an informal design specification that does not require, in applying the system to any particular problem or application, the use of a theorem-prover.

One embodiment of the system 100 is a software development system that includes a data flow and processing points for the data. System 100 may be representative of (i) computer applications and electrical engineering applications such as chip design and other electrical circuit design (ii) business management applications in areas such as workflow analysis, (iii) artificial intelligence applications in areas such as knowledge-based systems and agent-based systems, (iv) highly parallel and highly distributed applications involving computer command and control and computer-based monitoring, and (v) any other area involving process, sequence or algorithm design. According to the disclosed embodiments, the system 100 preferably converts different types of specifications (for example natural language scenarios or descriptions which are effectively pre-processed scenarios) into process-based formal specifications on which model checking and other mathematics-based verifications are performed, and then optionally converts the formal specification into code.

One embodiment of the system 100 preferably includes an informal specification 102 having a plurality of rules or requirements. The informal specification 102 can be expressed in restricted natural language, graphical notations, English language, programming language representations, scenarios or even using semi-formal notations such as unified modeling language (UML) use cases.

In one preferred embodiment, a scenario can be a natural language text (or a combination of any representations, e.g. graphical, of sequential steps or events) that describes the software's actions in response to incoming data and the internal goals of the software. Some scenarios may also describe communication protocols between systems and between the components within the systems. Also, some scenarios may be known as use-cases. Preferably, a scenario can describe one or more potential executions of a system, describing what happens in a particular situation and what range of behaviors is expected from or omitted by the system under various conditions.

In one embodiment, natural language scenarios are constructed in terms of individual scenarios written in a structured natural language. Different scenarios may be written by different stakeholders of the system, corresponding to the different views they have of how the system will perform, including alternative views corresponding to higher or lower levels of abstraction. Natural language scenarios may be generated by a user with or without mechanical or computer aid. The set of natural language scenarios provides the descriptions of actions that occur as the software executes. Some of these actions can be explicit and required, while others may be due to errors arising, or as a result of adapting to changing conditions as the system executes.

For example, if the system involves commanding space satellites, scenarios for that system may include sending commands to the satellites and processing data received in response to the commands. Natural language scenarios might be specific to the technology or application domain to which they are applied. A fully automated general purpose approach covering all domains is technically prohibitive to implement in a way that is both complete and consistent. To ensure consistency, the domain of application might be specific-purpose. For example, scenarios for satellite systems may not be applicable as scenarios for systems that manufacture agricultural chemicals.

In one preferred embodiment, the system 100 also includes a set of laws of concurrency 104. Laws of concurrency 104 may be defined as rules detailing equivalences between sets of processes combined in various ways and/or relating process-based descriptions of systems or system components to equivalent sets of traces. Laws of concurrency 104 may be expressed in any suitable language for describing concurrency. These languages may include, but are not limited to, CSP, CCS (Calculus of Communicating Systems) and variants of these languages.

In one embodiment, the informal specification 102 and a set of laws of concurrency 104 are received by a specification translator 106. Herein the plurality of rules or requirements of the informal specification 102 are translated to a process-based specification 108 or other formal specification language representation. According to at least one embodiment, the translator 106 may accomplish the translation mechanically, where a mechanical translation may be defined to mean that no manual intervention in the direct translation is provided. In some embodiments, the process-based specification 108 might be an intermediate notation or language of sequential process algebra such as CSP.

The preferred process-based specification 108 is, in some embodiments, mathematically and provably equivalent to the informal specification 102. However, one skilled in the art will recognize that "mathematically equivalent" does not necessarily mean "mathematically equal." Mathematical equivalence of two elements A and B means that A implies B and B implies A. Note that applying the laws of concurrency 104 to the process-based specification 108 would allow for the retrieval of a trace-based specification that is equivalent to the informal specification 102. Further note that the process-based specification of one embodiment is mathematically equivalent to, rather than necessarily equal to, the original informal specification 108. This aspect indicates the process may be reversed, allowing for reverse engineering of existing systems, or for iterative development of more complex systems.

In some embodiments, the system includes an analyzer 110 to determine various properties such as the existence of omissions, deadlock, livelock, and race conditions in the process-based specification 108.

In one embodiment, the system 100 also includes a code translator 112 to translate the plurality of process-based specification segments 108 to a set of instructions in a high-level computer language 114, such as the Java language.

System 100 can be operational for a wide variety of informal specification languages and applications; thus system 100 is preferably generally applicable. Such applications might include distributed software systems, sensor networks, robot operation, complex scripts for spacecraft integration and testing, chemical plant operation and control, and autonomous systems. However, one skilled in the art will recognize that other applications not listed herein may fall within the scope of this invention.

Moreover, the system 100 of one embodiment can provide regeneration of the executable system when requirements dictate a change in the high level specification. In a preferred system 100, all that may be required to update the generated application is a change in the informal specification 102, after which the changes and validation might ripple through in a mechanical process when system 100 operates. This also allows the possibility of cost effectively developing competing designs for a product and implementing each to determine the best one.

Most notably, the preferred system 100 of at least one embodiment does not include an automated logic engine, such as a theorem prover, to infer the process-based specification segments from the informal specification. However, the plurality of process-based specification segments 108 may be provably correct implementations of the informal specification 102, provided the developer of an instance of system 100 has properly used a theorem prover (not shown) to prove that the direct mechanical translator 106 correctly translates informal specifications into formal specifications.

Figure 4:
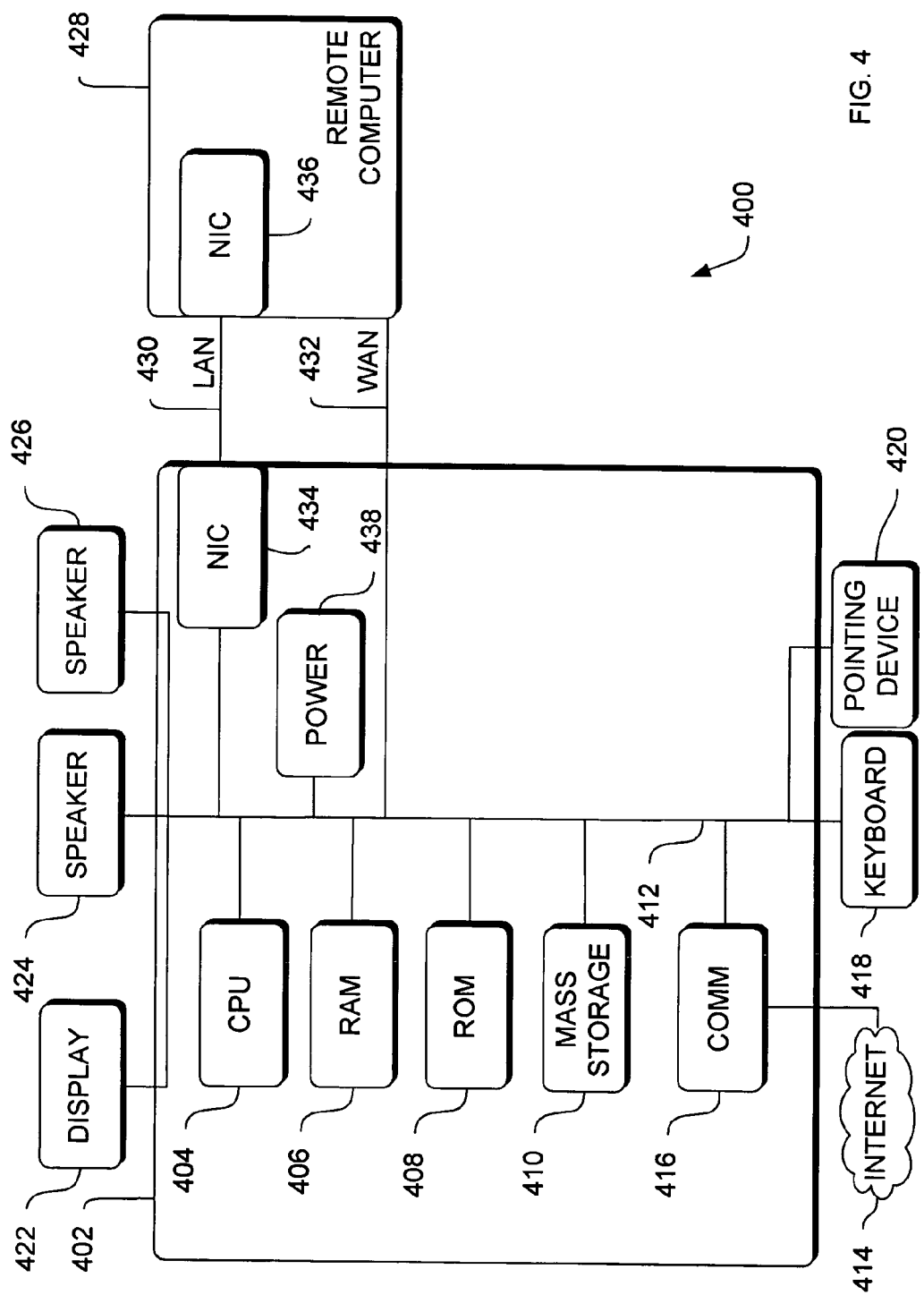
FIG. 4 is a block diagram of an embodiment of the hardware and operating environment in which different embodiments can be practiced.

Some embodiments of the system 100 operate in a multi-processing, multi-threaded operating environment on a computer, such as computer 402 in FIG. 4. While the system 100 is not limited to any particular informal specification 102, plurality of rules or requirements, set of laws of concurrency 104, specification translator 106, process-based specification 108, analyzer 110, code translator 112 and high-level computer language 114, for sake of clarity a simplified informal specification 102, plurality of rules or requirements, set of laws of concurrency 104, specification translator 106, process-based specification 108, analyzer 110, code translator 112, and high-level computer language 114 are described, although one skilled in the art will understand that other elements may fall within the purview of this invention as defined by the claims.

Embodiments of the preferred system 100 may relate to the fields of chemical or biological process design or mechanical system design, and, generally to any field where the behaviors exhibited by a process to be designed is described by the use of a set of scenarios expressed in natural language, or some appropriate graphical notation or textual notation.

Method Embodiments

In the previous section, a system level overview of the operation of at least one embodiment is described. In this section, the particular methods of such embodiments are described by reference to a series of flowcharts. Describing the methods by reference to a flowchart enables one skilled in the art to develop such programs, firmware, or hardware, including such instructions to carry out the methods on suitable computers, executing the instructions from computer-readable media. Similarly, the methods performed by the server computer programs, firmware, or hardware are also composed of computer-executable instructions. Methods 200 and 300 are preferably performed by a program executing on, or performed by firmware or hardware that is a part of, a computer, such as computer 402 in FIG. 4.

Figure 2:
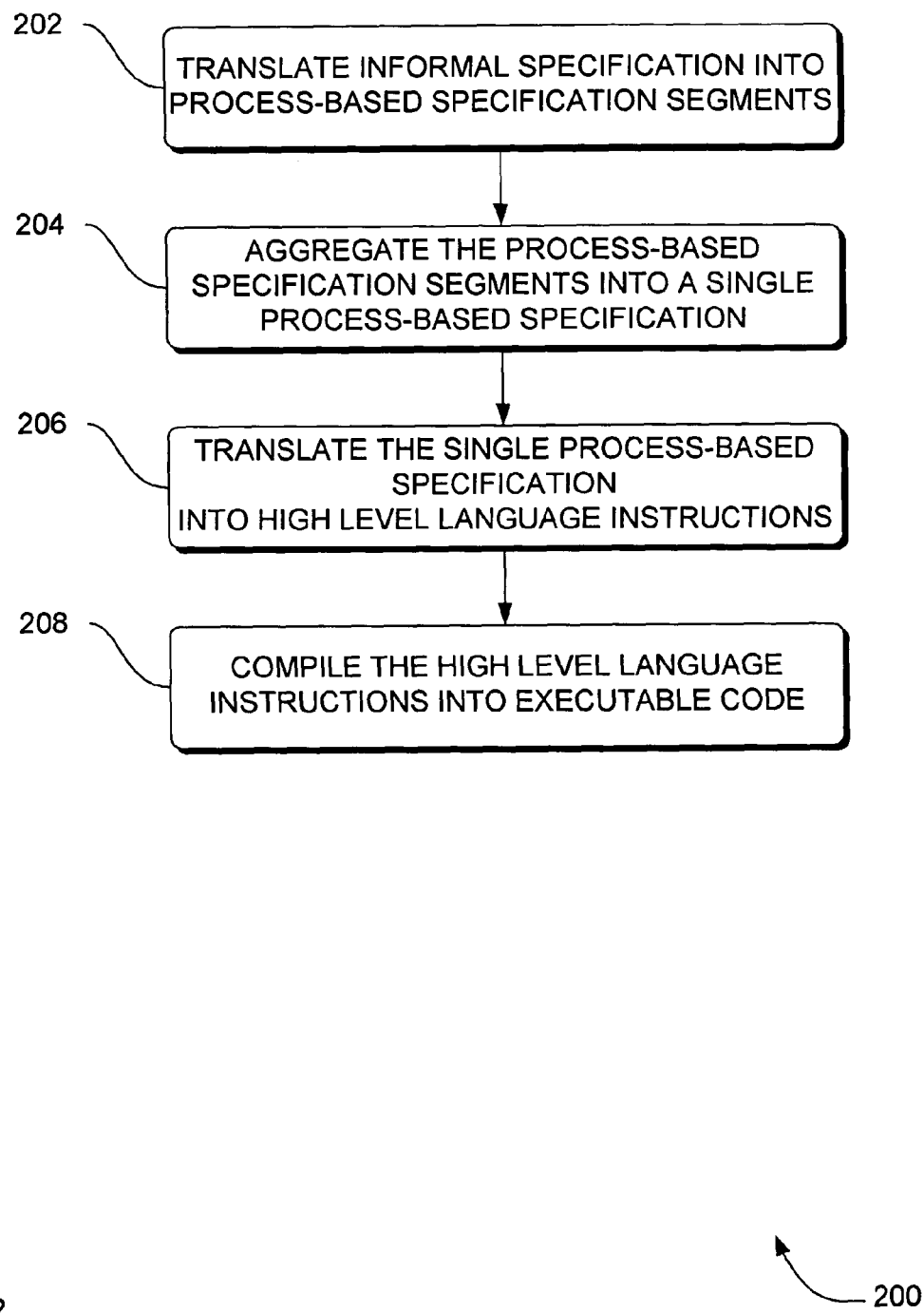
FIG. 2 is a flowchart of a method to generate an executable system from an informal specification, according to an embodiment.

FIG. 2 is a flowchart of a method 200 to generate an executable system from an informal specification, according to an embodiment. Method 200 may solve the need in the art to generate executable computer instructions from requirements with neither the time involved in manually writing the executable computer instructions, nor the mistakes that may arise in manually writing the executable computer instructions, without using a theorem prover.

Figure 3:
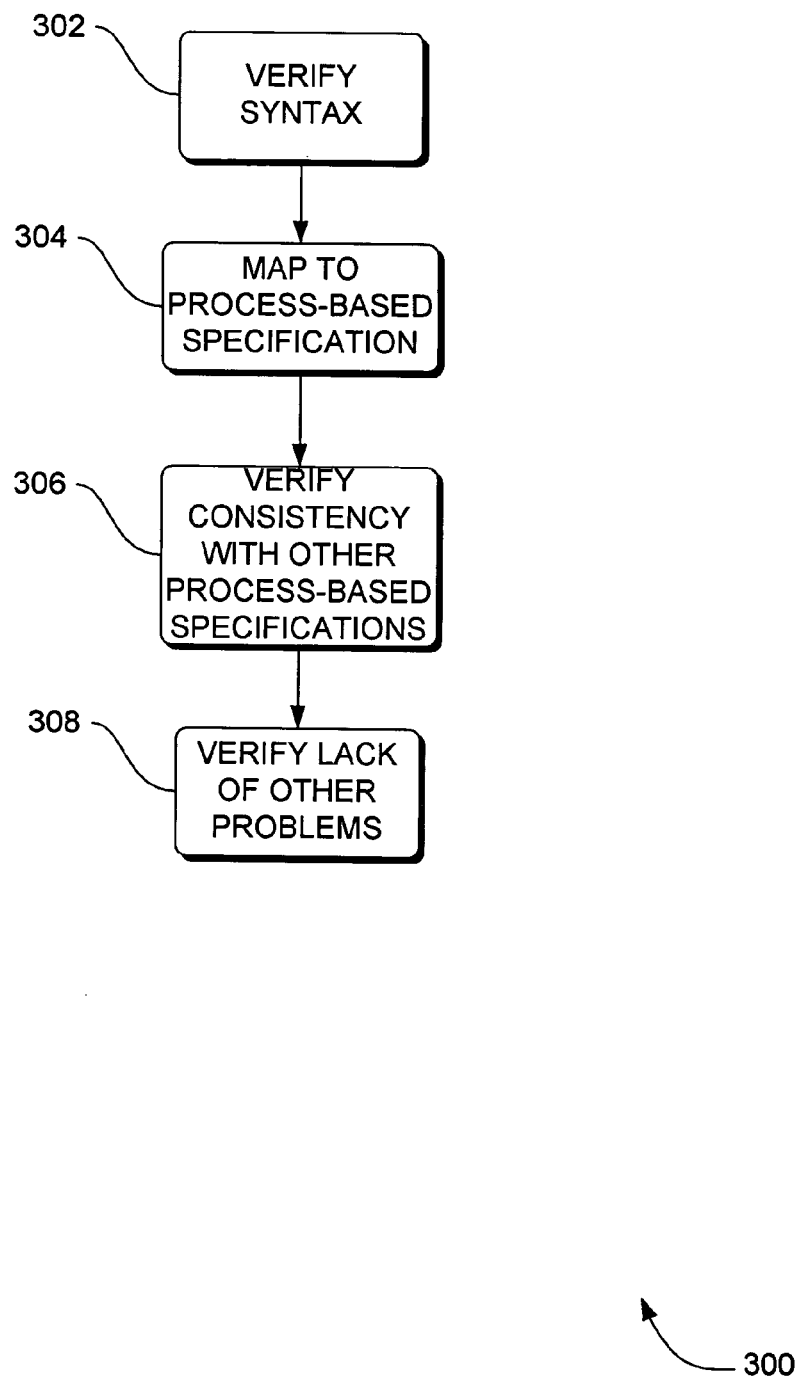
FIG. 3 is a flowchart of a method to translate mechanically each of a plurality of requirements of the informal specification to a plurality of process-based specification segments, according to an embodiment.

In at least one embodiment, the method 200 includes translating 202 each of a plurality of requirements of the informal specification to a plurality of process-based specification segments. In some embodiments, the translating 202 includes inferring the process-based specification segments from the informal specification. One embodiment of translating 202 is shown in FIG. 3 below.

In some embodiments, the process-based specification is process algebra notation. That embodiment may satisfy the need in the art for an automated, mathematics-based process for requirements validation that does not require large computational facilities.

Thereafter, method 200 may include aggregating 204 the plurality of process-based specification segments into a single process-based specification model.

Subsequently, method 200 may include translating 206 the single process-based specification model to instructions encoded in the Java computer language or some other high-level computer programming language. Thereafter, the method 200 may include compiling 208 the instructions encoded in the Java computer language or other high level computer language into a file of executable instructions.

In some embodiments, method 200 includes invoking the executable instructions, which provides a method to convert informal specifications to an application system without involvement from a computer programmer.

Most notably, some embodiments of the method 200 do not include invoking a theorem prover to infer the process-based specification segments from the informal specification.

FIG. 3 is a flowchart of a method 300 which may translate each of a plurality of requirements of the informal specification to a plurality of process-based specification segments, according to an embodiment. The method 300 can be described as one embodiment of translating 202 in FIG. 2.

In one embodiment, the method 300 includes verifying 302 the syntax of the plurality of requirements of the informal specification. Thereafter, method 300 may include mapping 304 the plurality of requirements of the informal specification to a process-based specification.

In some embodiments, method 300 subsequently also includes verifying 306 consistency of the process-based specification with at least one other process-based specification. In some embodiments, method 300 subsequently also includes verifying 308 a lack of other problems in the process-based specification. One example of other problems is unreachable states in the process defined in the process-based specification, although one skilled in the art will appreciate that any number of other applicable problems exist, which also fall within the scope of this invention.

In some embodiments, methods 200 and 300 are implemented as a communication media, such as a computer data signal embodied in a carrier wave that represents a sequence of instructions which, when executed by a processor, such as the processor 404 in FIG. 4, cause the processor to perform the respective method or as a computer-accessible storage medium having stored executable instructions capable of directing a processor, such as the processor 404 in FIG. 4, to perform the respective method. In varying embodiments, the type of storage medium may be a magnetic medium, an electronic medium, an electromagnetic medium, an optical medium or other mediums that will be readily apparent to one skilled in the art and fall within the scope of this invention.

Hardware and Operating Environment

FIG. 4 is a block diagram of the hardware and operating environment 400 in which different embodiments can be practiced. The description of FIG. 4 provides an overview of computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment. Some embodiments can also be at least partially implemented in a quantum mechanical computing and communications environment.

In one embodiment, a computer 402 includes a processor 404, commercially available from Intel®, MOTOROLA®, Cyrix® and others. The computer 402 may also include random-access memory (RAM) 406, read-only memory (ROM) 408, and one or more mass storage devices 410, and a system bus 412, that operatively couples various system components to the processing unit 404. The memory 406, 408, and mass storage devices 410 are preferably types of computer-accessible media. Mass storage devices 410 may be more specifically types of nonvolatile computer-accessible media and can include one or more hard disk drives, floppy disk drives, optical disk drives, and tape cartridge drives. The processor 404 preferably executes computer programs stored on the computer-accessible media.

The computer 402 can be communicatively connected to the Internet 414 (or any communications network) via a communication device 416. Internet 414 connectivity is well known within the art. In one embodiment, a communication device 416 is a modem that responds to communication drivers to connect to the Internet via what is known in the art as a "dial-up connection." In another embodiment, a communication device 416 is an Ethernet® or similar hardware network card connected to a local-area network (LAN) that itself is connected to the Internet via what is known in the art as a "direct connection" (e.g., T1 line, cable modem, DSL, wireless, etc.).

Preferably user enters commands and information into the computer 402 through input devices such as a keyboard 418 or a pointing device 420. The keyboard 418 permits entry of textual information into the computer 402, as known within the art, and embodiments are not limited to any particular type of keyboard. Pointing device 420 permits the control of the screen pointer provided by a graphical user interface (GUI) of operating systems such as versions of Microsoft Windows®. Embodiments are not limited to any particular pointing device 420. Such pointing devices include mice, touch pads, trackballs, remote controls and point sticks. Other input devices (not shown) can include a microphone, joystick, game pad, gesture-recognition or expression recognition devices, or the like.

In some embodiments, the computer 402 is operatively coupled to a display device 422. Display device 422 is preferably connected to the system bus 412. Display device 422 may permit the display of information, including computer, video and other information, for viewing by a user of the computer. Embodiments are not limited to any particular display device 422. Such display devices include cathode ray tube (CRT) displays (monitors), as well as flat panel displays such as liquid crystal displays (LCD's) or image and/or text projection systems or even holographic image generation devices. In addition to a monitor, computers typically include other peripheral input/output devices such as printers (not shown). Speakers 424 and 426 (or other audio device) may provide audio output of signals. Speakers 424 and 426 are also preferably connected to the system bus 412.

According to one embodiment, the computer 402 also includes an operating system (not shown) that is stored on the computer-accessible media RAM 406, ROM 408, and mass storage device 410, and is and executed by the processor 404. Examples of operating systems include Microsoft Windows®, Apple MacOS®, Linux®, UNIX®. Examples are not limited to any particular operating system, however, and the construction and use of such operating systems are well known within the art.

Embodiments of computer 402 are not limited to any type of computer 402. In varying embodiments, computer 402 comprises a PC-compatible computer, a MacOS®-compatible computer, a Linux®-compatible computer, or a UNIX®-compatible computer. The construction and operation of such computers are well known within the art.

Computer 402 can be operated using at least one operating system to provide a graphical user interface (GUI) including a user-controllable pointer. Computer 402 can have at least one web browser application program executing within at least one operating system, to permit users of computer 402 to access an intranet, extranet or Internet world-wide-web pages as addressed by Universal Resource Locator (URL) addresses. Examples of browser application programs include, but are not limited to, Netscape Navigator® and Microsoft Internet Explorer®.

The computer 402 can operate in a networked environment using logical connections to one or more remote computers, such as remote computer 428. These logical connections may be achieved by a communication device coupled to, or a part of, the computer 402. Embodiments are not limited to a particular type of communications device. The remote computer 428 can be another computer, a server, a router, a network PC, a client, a peer device or other common network node. The logical connections depicted in FIG. 4 include a local-area network (LAN) 430 and a wide-area network (WAN) 432. Such networking environments are commonplace in offices, enterprise-wide computer networks, intranets, extranets and the Internet.

When used in a LAN-networking environment, the computer 402 and remote computer 428 are preferably connected to the local network 430 through network interfaces or adapters 434, which is one type of communications device 416. Remote computer 428 may also include a network device 436. When used in a conventional WAN-networking environment, the computer 402 and remote computer 428 preferably communicate with a WAN 432 through modems or other methods and apparatus known to one skilled in the art (not shown). At least one example of a modem, which can be internal or external, can be connected to the system bus 412. In a networked environment, program modules depicted relative to the computer 402, or portions thereof, can be stored in the remote computer 428.

Preferably, the computer 402 also includes a power supply 438. Each power supply can be a battery.

CSP Implementation

Figure 5:
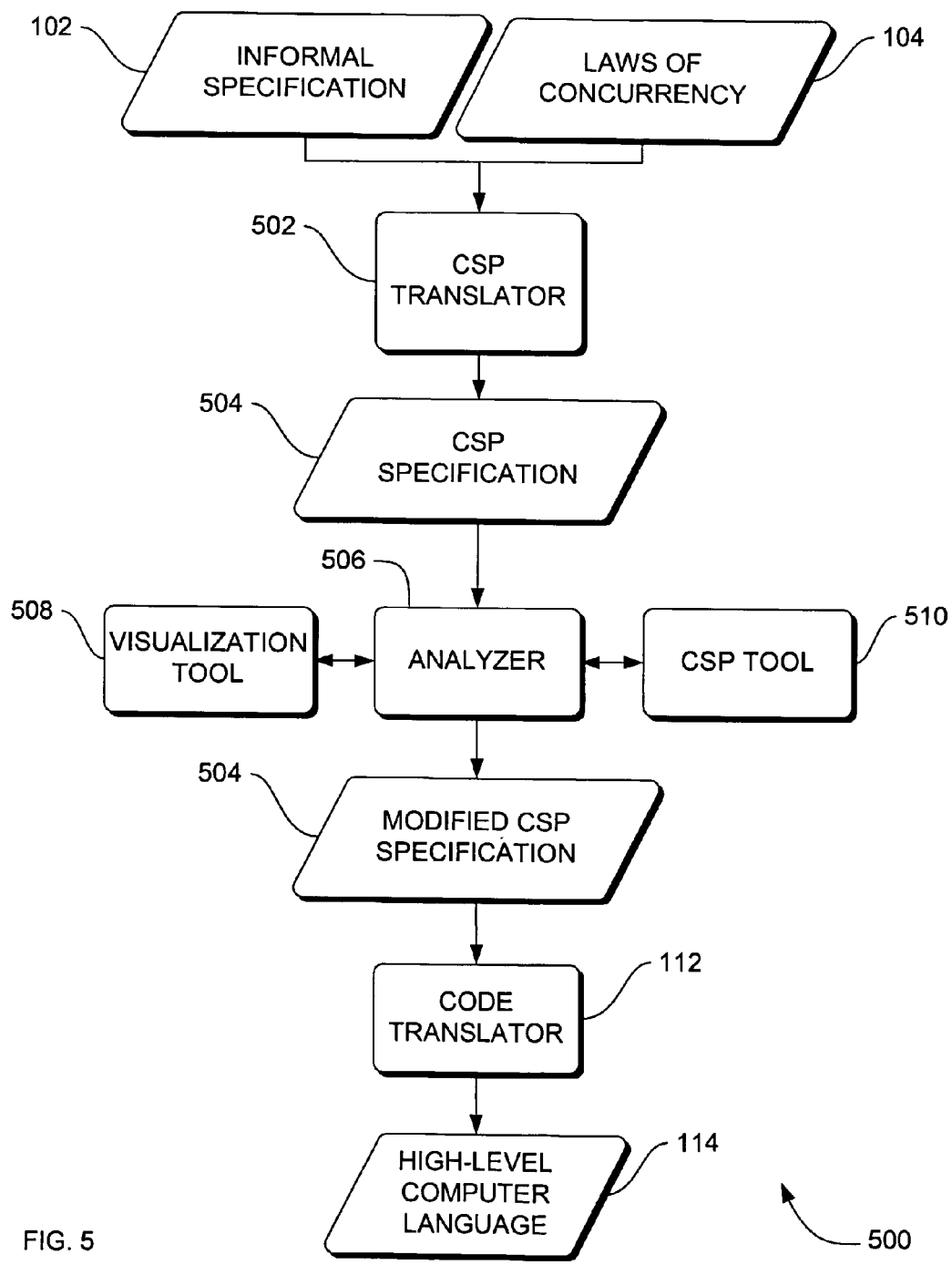
FIG. 5 is a block diagram of a particular CSP implementation of an apparatus to generate a high-level computer source code program from an informal specification, according to an embodiment.

Referring to FIG. 5, a particular CSP implementation 500 is described in conjunction with the system overview in FIG. 1 and the methods described in conjunction with FIG. 2.

FIG. 5 is a block diagram of a particular CSP implementation of an apparatus 500 to generate a high-level computer source code program from an informal specification. Apparatus 500 may solve the need in the art for an automated, generally applicable way to produce a system that is a provably correct implementation of an informal design specification, which does not require use of a theorem-prover.

According to one embodiment, the apparatus 500 includes an informal specification 102 having a plurality of rules or requirements. The informal specification can be expressed in restricted natural language, graphical notations, or even using semi-formal notations such as unified modeling language (UML) use cases. Apparatus 500 may also include a set of laws of concurrency 104.

The informal specification 102 and a set of laws of concurrency 104 may preferably be received by a CSP translator 502. The plurality of rules or requirements of the informal specification 102 can then be translated, for example mechanically, to a specification 504 encoded in CSP.

In some embodiments, the apparatus 500 includes a formal specification analyzer 506 to perform model verification/checking and to determine the existence of omissions, deadlock, livelock and race conditions, or other failure conditions, in the CSP specification 504. In some embodiments, the formal specification analyzer 506 receives and transmits information from and to a visualization tool 508 that provides a way to modify the CSP specification 504. In some embodiments, the formal specification analyzer 506 receives and transmits information from and to a tool 510 designed for CSP that provides a way to modify the CSP specification 504.

The formal specification analyzer 506 may generate a modified CSP specification 504 that is in turn received by a code translator 112 or compiler to translate the plurality of process-based specification segments 108 to a set of instructions in a high-level computer language 114, such as Java language.

Further, formal specification analyzer 506 may allow the user to manipulate the formal specification 160 in various ways. For example, the formal specification analyzer 506 may allow the user to examine the system described by the informal specification 102, and to manipulate it. The CSP specification 504 may be analyzed to highlight undesirable behavior, such as race conditions, and equally important, to point out errors of omission in the informal specification 102. The formal specification analyzer 506 is an optional but useful stage in the disclosed embodiments of the present invention. If the formal specification analyzer 506 is not used, then the process-based specification 160 and the modified CSP specification 504 can be identical. Hence, if the formal specification analyzer 506 is not used then preferably all references to the modified CSP specification 504 disclosed below also apply to the CSP specification 504.

Most notably, the apparatus 500 of some embodiments does not include an automated logic engine, such as a theorem prover, to infer the process-based specification segments from the informal specification.

Apparatus 500 is preferably operational for a wide variety of informal specification languages and applications, and thus the apparatus 500 can be generally applicable. Such applications include distributed software systems, sensor networks, robot operation, complex scripts for spacecraft integration and testing, and autonomous systems.

Figure 6:
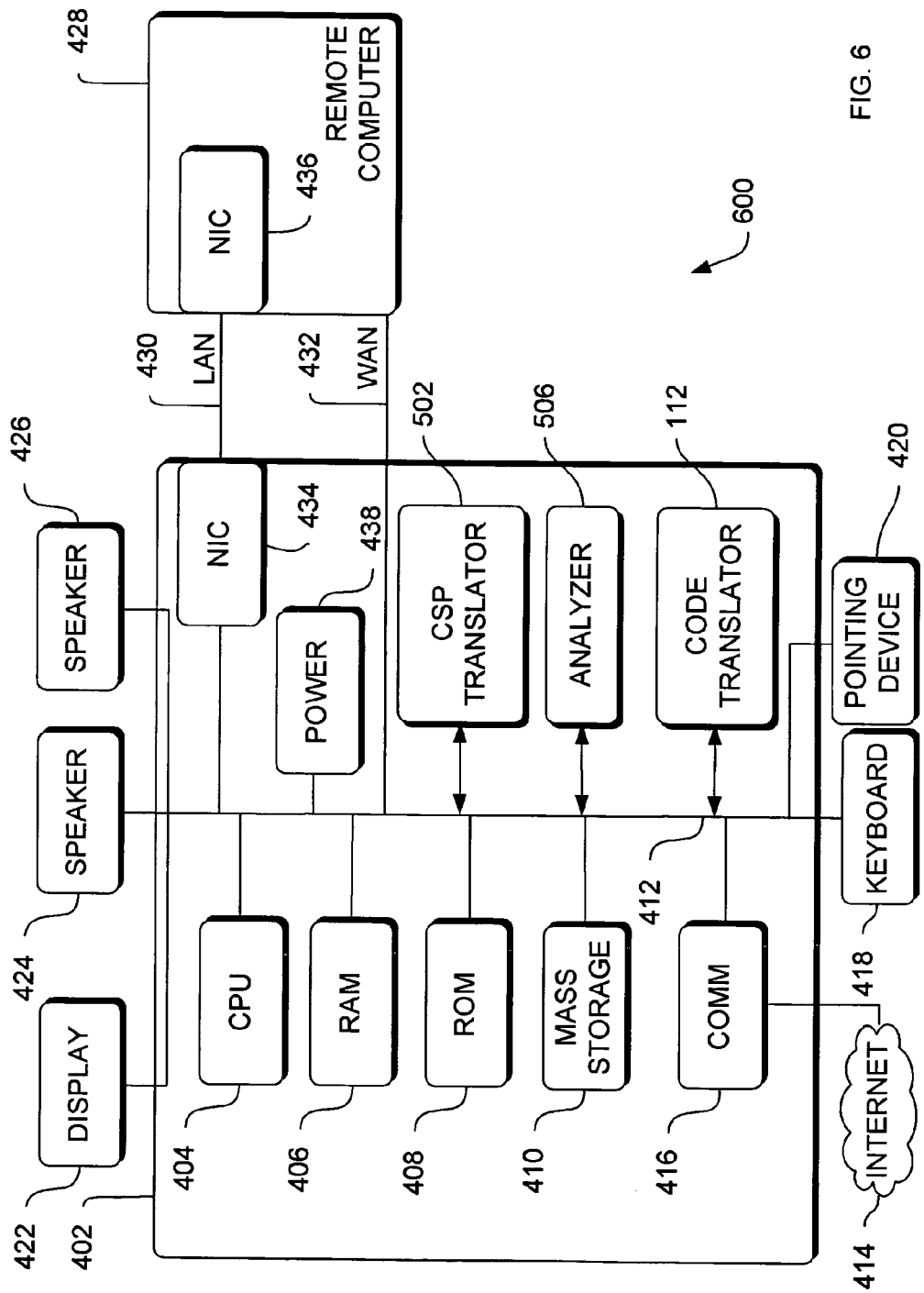
FIG. 6 is a block diagram of an embodiment of a hardware and operating environment in which a particular CSP implementation of FIG. 5 is implemented.

Preferably, the apparatus 500 components of the CSP translator 502, the formal specification analyzer 506, visualization tool 508, CSP tool 510 and the code translator 112 can be embodied as computer hardware circuitry or as a computer-readable program, or a combination of both, such as shown in FIG. 6. In another embodiment, apparatus 500 is implemented in an application service provider (ASP) system.

More specifically, in the computer-readable program embodiment, the programs can be structured in an object-orientation using an object-oriented language such as Java, Smalltalk or C++, and the programs can be structured in a procedural-orientation using a procedural language such as COBOL or C. The software components may communicate in any of a number of ways that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components can execute on as few as one computer as in computer 402 in FIG. 4, or on at least as many computers as there are components. One skilled in the art will understand that other computer languages, structures, and communication interfaces and techniques may be used that fall within the scope of this invention as defined by the claims.

CONCLUSION

A direct mechanical translator of informal specifications is described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations. For example, although described in procedural terms, one of ordinary skill in the art will appreciate that implementations can be made in an object-oriented design environment or any other design environment that provides the required relationships.

In particular, one of skill in the art will readily appreciate that the names of the systems, methods and apparatus are not intended to limit embodiments. Furthermore, additional systems, methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

The terminology used in this application is meant to include all object-oriented, database and communication environments and alternate technologies which provide the same functionality as described herein.

We claim:

1. A computer-accessible storage medium having executable instructions to generate computer-language instructions from an informal specification, the executable instructions capable of directing a processor to perform:
   translating an informal specification to a plurality of formal specification segments, wherein translating comprises a verification process using mathematical laws by which sequences of data in the informal specification are mapped to at least one of a plurality of formal specification segments using an automated logic engine, wherein an inference engine iteratively applies a set of rules to a set of data representing a problem to determine a solution to the problem by logical manipulation and analysis of the data; the mathematical laws including the Laws of Concurrency, whereby the Laws of Concurrency are algebraic laws that (a) allow at least one process to be manipulated and analyzed; (b) permit formal reasoning about equivalences between processes; and (c) determine traces from the at least one process; and
   translating the sequences of data in the informal specification to at least one of a plurality of formal specification segments without the use of an automated logic engine, wherein translating comprises a process by which the sequences of data in the informal specification are matched to the at least one of a plurality of formal specification segments as specified by the prior mapping; and
   translating the plurality of formal specification segments to high-level computer language instructions using the mathematical laws, wherein the plurality of formal specification segments are matched to high-level computer language instructions.

2. The computer-accessible storage medium of claim 1, wherein the plurality of formal specification segments further comprise:
   a sequential process algebra, wherein the sequential process algebra is a member of a diverse family of related approaches to formally modeling concurrent systems that provide a tool for the high-level description of interactions, communications, and synchronizations between a collection of independent agents or processes, along with algebraic laws that allow process descriptions to be manipulated and analyzed, and permit formal reasoning about equivalences between processes.

3. The computer-accessible storage medium of claim 2, wherein the sequential process algebra further comprises:
   a language of Communicating Sequential Processes, wherein the language of Communicating Sequential Processes is a formal language for describing patterns of interaction in concurrent systems.

4. The computer-accessible storage medium of claim 1, wherein the high-level computer language instructions further comprise:
   object-oriented high-level programming language instructions.

5. The computer-accessible storage medium of claim 1, wherein the executable instructions capable of directing the processor to perform translating an informal specification to a plurality of formal specification segments further comprise:
   verifying a syntax of the informal specification, wherein verifying the syntax comprises checking that the sequence of data of the informal specification complies with the encoded syntax rules;
   translating the informal specification to a plurality of formal specification segments.

6. The computer-accessible storage medium of claim 5, wherein the executable instructions capable of directing the processor to perform translating an informal specification to a plurality of formal specifications segments further comprise:
   verifying a consistency of the plurality of formal specifications segments with each other; and
   verifying a lack of other problems in the plurality of formal specification segments.

7. The computer-accessible storage medium of claim 6, the medium further comprising executable instructions capable of directing the processor to perform:
   determining correctness of the plurality of formal specification segments using an automated logic engine.

8. The computer-accessible storage medium of claim 1, the medium further comprising executable instructions capable of directing the processor to perform:
   analyzing the plurality of formal specification segments, whereby analyzing includes identifying at least one equivalent alternative process-based specification and characterizing differences between the process-based specification and the at least one alternative process-based specification, wherein differences include the number of processes, deterministic behavior, and competition for resources.

9. The computer-accessible storage medium of claim 1, the medium further comprising executable instructions capable of directing the processor to perform:
   aggregating the plurality of formal specification segments into a single model.

10. The computer-accessible storage medium of claim 1, the medium further comprising executable instructions capable of directing the processor to perform:
    modifying the informal specification.

11. A computer-accessible storage medium having executable instructions to generate computer instructions from an informal specification, the executable instructions capable of directing a processor to perform:
    translating each of a plurality of requirements of the informal specification to a plurality of process-based specification segments, wherein translating comprises a verification process using mathematical laws by which the requirements in the informal specification are mapped to at least one of a plurality of process-based specification segments using an automated logic engine, wherein an inference engine iteratively applies a set of rules to a set of data representing a problem to determine a solution to the problem by logical manipulation and analysis of the data; the mathematical laws including the Laws of Concurrency, whereby the Laws of Concurrency are algebraic laws that (a) allow at least one process to be manipulated and analyzed; (b) permit formal reasoning about equivalences between processes; and (c) determine traces from the at least one process; and
    translating the requirements in the informal specification to the at least one of a plurality of process-based specification segments without the use of an automated logic engine, wherein translating comprises a process by which the requirements in the informal specification are matched to the at least one of a plurality of process-based specification segments as specified by the prior mapping;
    aggregating the plurality of process-based specification segments into a single process-based specification model; and translating the single process-based specification model to instructions encoded in an object-oriented high-level programming language.

12. The computer-accessible storage medium of claim 11, wherein the executable instructions capable of directing a processor to perform translating each of a plurality of requirements of the informal specification to a plurality of process-based specification segments further comprise:
   verifying a syntax of the plurality of requirements of the informal specification;
   mapping the plurality of requirements of the informal specification to a process-based specification;
   verifying a consistency of the process-based specification with at least one other process-based specification; and
   verifying a lack of other problems in the process-based specification.

13. The computer-accessible storage medium of claim 11, the medium further comprising executable instructions capable of directing a processor to perform:
   compiling the instructions encoded in an object-oriented programming language into a file of executable instructions.

14. The computer-accessible storage medium of claim 11, wherein the process-based specification model further comprises:
   a language of Communicating Sequential Processes, wherein the language of Communicating Sequential Processes is a formal language for describing patterns of interaction in concurrent systems.

15. A system to generate an executable software system, the system comprising:
   a processor;
   a Communicating Sequential Processes translator, operable to receive informal specifications and mathematical laws; and to generate a Communicating Sequential Processes specification comprising a plurality of process-based specification segments;
   the translator performs a verification process comprising using the mathematical laws by which the informal specifications are mapped to the Communicating Sequential Processes specification segments using an automated logic engine, wherein an inference engine iteratively applies a set of rules to a set of data representing a problem to determine a solution to the problem by logical manipulation and analysis of the data; the mathematical laws including the Laws of Concurrency, whereby the Laws of Concurrency are algebraic laws that (a) allow at least one process to be manipulated and analyzed; (b) permit formal reasoning about equivalences between processes; and (c) determine traces from the at least one process; and
   the translator translates the informal specifications to the Communicating Sequential Processes specification segments without the use of an automated logic engine, wherein translating comprises a process by which the informal specifications are matched to the Communicating Sequential Processes specification segments as specified by the prior mapping;
   an analyzer operable to perform model verification/checking and determine existence of omissions, deadlock, livelock, race conditions, and other problems and inconsistencies in the Communicating Sequential Processes specification, wherein an omission includes missing model-specification details for a circumstance that should be covered by the model as a whole, wherein a deadlock condition is a condition in which two executing processes each wait for the other to finish, wherein a livelock condition is a condition in which two executing processes each wait for the other to finish, as their relative internal states change continually during execution without progress being made by either process, and wherein a race condition is a cause of concurrency problems when multiple processes access a shared resource, with at least one of the accesses being a write, with no mechanism used by any of the processes to moderate simultaneous access to the shared resource;
   a code translator operable to translate the plurality of process-based specification segments to a set of instructions in a high-level computer language; and
   a compiler to compile the instructions encoded in the high-level computer language into a file of executable instructions.

16. The system of claim 15, wherein the system further comprises:
   a visualization tool operably coupled to the analyzer for modifying the Communicating Sequential Processes specification.

17. The system of claim 15, wherein the system further comprises:
   a Communicating Sequential Processes tool operably coupled to the analyzer for modifying the Communicating Sequential Processes specification.

18. The system of claim 15, wherein the high-level computer language further comprises:
   an object-oriented high-level programming language.

19. A system, the system comprising:
   a processor;
   a storage device coupled to the processor, the storage device operable to store an informal system requirements specification;
   a software apparatus operative on the processor operable to translate the informal specification info a formal specification, wherein the software apparatus further comprises:
   a translator, the translator operable to perform a verification process comprising using mathematical laws by which the informal specification is mapped to the formal specification using an automated logic engine, wherein an inference engine iteratively applies a set of rules to a set of data representing a problem to determine a solution to the problem by logical manipulation and analysis of the data; the mathematical laws including the Laws of Concurrency, whereby the Laws of Concurrency are algebraic laws that (a) allow at least one process to be manipulated and analyzed; (b) permit formal reasoning about equivalences between processes; and (c) determine traces from the at least one process; and
   the translator operable to translate the informal specifications to the Communicating Sequential Processes specification segments without the use of an automated logic engine, wherein translating comprises a process by which the informal specifications are matched to the Communicating Sequential Processes specification segments as specified by the prior mapping;
   an analyzer operable to perform model verification/checking and determine existence of omissions, deadlock, livelock, race conditions, and other problems and inconsistencies in the Communicating Sequential Processes specification, wherein an omission includes missing model-specification details for a circumstance that should be covered by the model as a whole, wherein a deadlock condition is a condition in which two executing processes each wait for the other to finish, wherein a livelock condition is a condition in which two executing processes each wait for the other to finish, as their relative internal states change continually during execution without progress being made by either process, and wherein a race condition is a cause of concurrency problems when multiple processes access a shared resource, with at least one of the accesses being a write, with no mechanism used by any of the processes to moderate simultaneous access to the shared resource;

a code translator operable to translate the formal specification to a set of instructions in a high-level computer language; and a compiler to compile the instructions encoded in the high-level computer language into a file of executable instructions.

* * * * *